April 19, 1932.  W. H. MARTIN  1,854,707
MULTIPLE MOTOR
Filed May 19, 1928   2 Sheets-Sheet 1
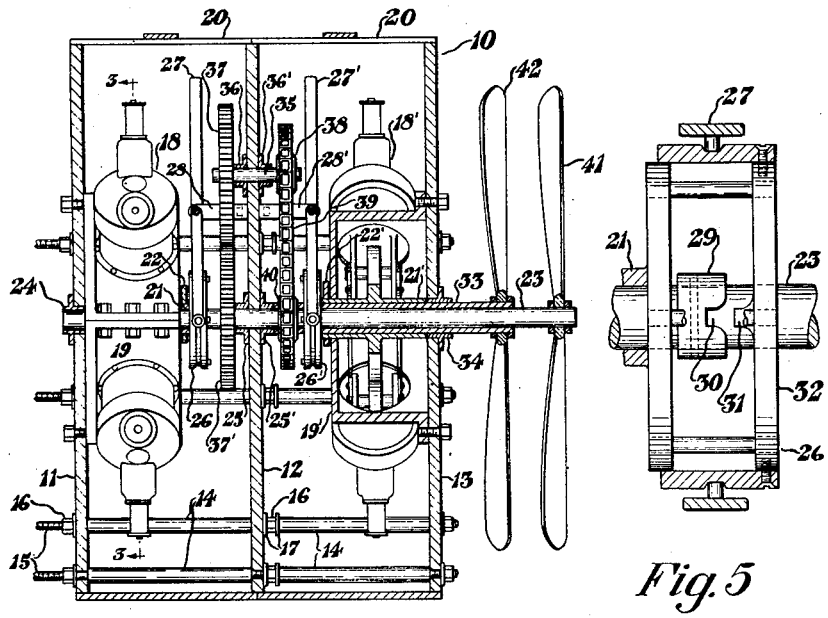
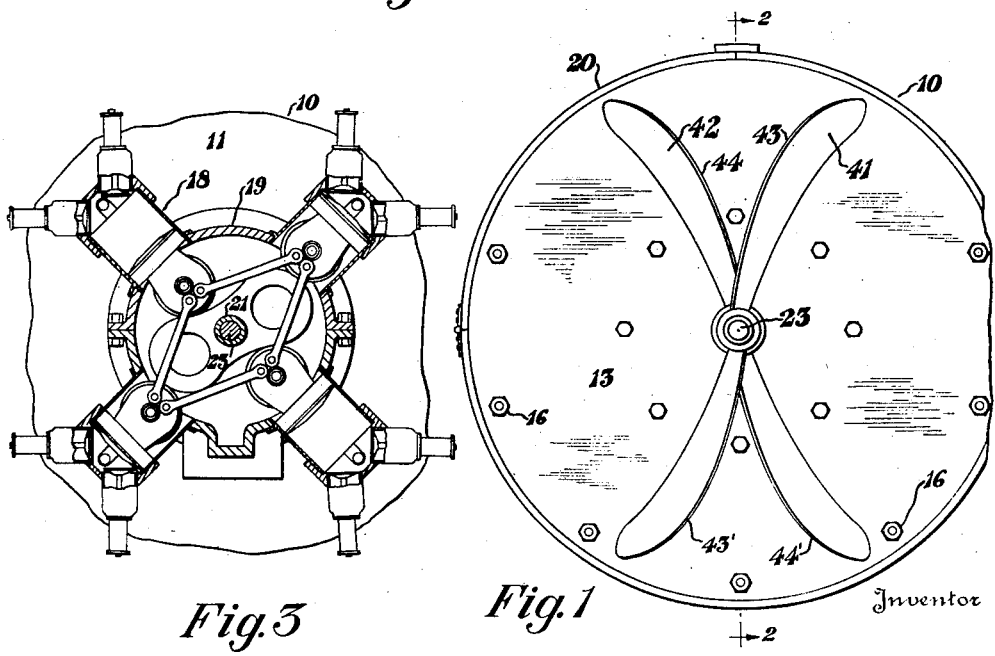
Inventor
W. H. Martin
By Harry Frease
Attorney

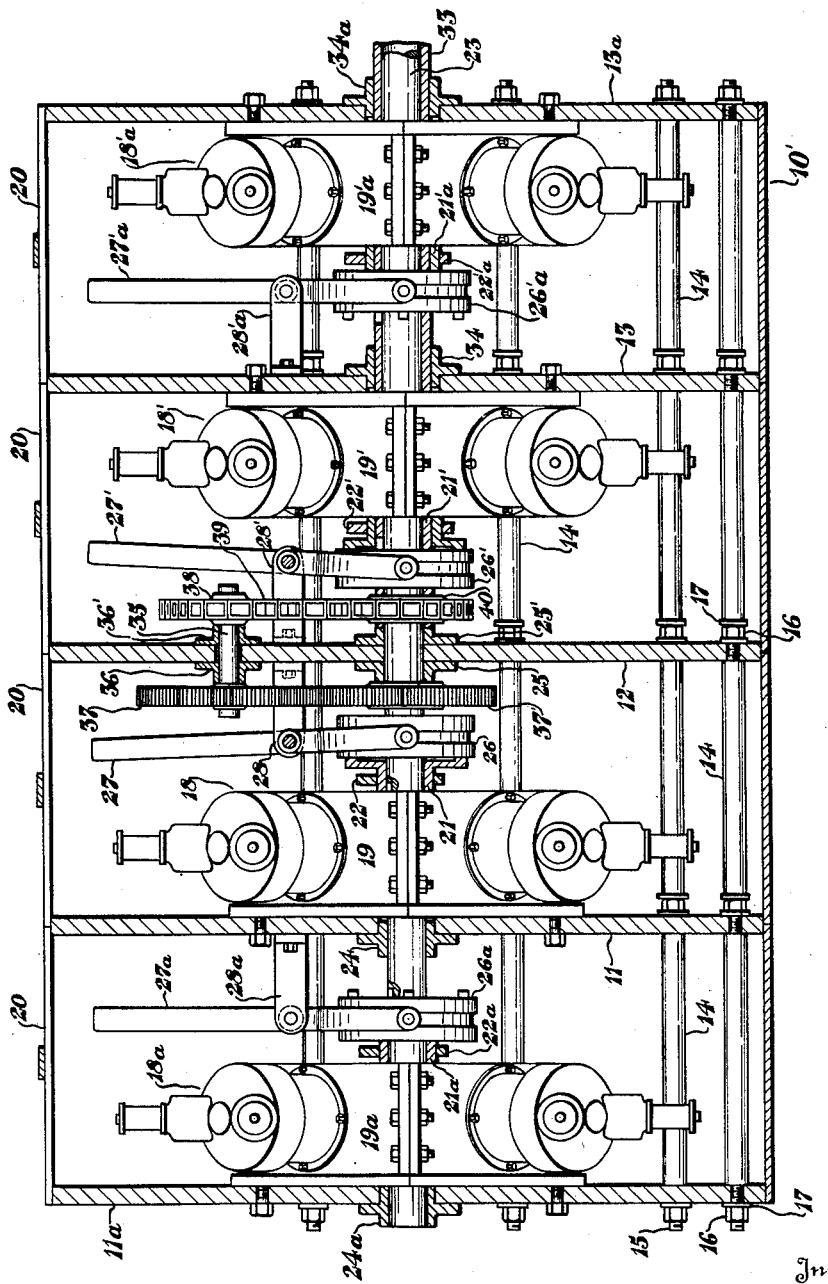

Patented Apr. 19, 1932

1,854,707

UNITED STATES PATENT OFFICE

WILLIAM H. MARTIN, OF CANTON, OHIO

MULTIPLE MOTOR

Application filed May 19, 1928. Serial No. 279,012.

My invention relates to multiple motors arranged for driving connection with a pair of shafts, each preferably turning in opposite directions.

Such an arrangement is desirable for driving reversely rotating coaxial propellers in aircraft, so that unbalanced torque is eliminated.

Multiple motors are desirable for aircraft purposes, so that if one motor fails, the remaining motors will provide the necessary propelling force to maintain flight.

Accordingly the objects of the present improvements include the provision of a novel, compact, easily constructed, and easily operated, multiple motor, including a plurality of motors, a pair of shafts preferably adapted for rotation in reverse directions, and preferably selective means for connecting each of the motors for simultaneously driving both of the shafts.

Further objects of the improvements include the provision of a multiple motor including a plurality of separate motors, any one of which may be completely disassembled and repaired during the operation of any of the other motors for driving the common shafts. Further objects of the improvements include also the provision of a novel form and arrangement for the reversely rotating propellers, whereby their efficiency is increased.

These and ancillary objects are attained in the present improvements hereinafter set forth in detail, and claimed.

Preferred embodiments of the invention are illustrated in the accompanying drawings forming part hereof, in which Figure 1 is a front elevation of one embodiment of the improved multiple motor arranged for driving a pair of improved reversely rotating propellers;

Fig. 2, a longitudinal axial sectional view thereof as on line 2—2, Fig. 1;

Fig. 3, a transverse sectional view thereof as on line 3—3, Fig. 2;

Fig. 4, a view similar to Fig. 2 of a modified embodiment in which four separate motors together with other parts constitute the multiple motor; and Fig. 5, a detached view, with parts broken away of one type of clutch for use with the improved motor.

Similar numerals refer to similar parts throughout the several views.

The embodiment of the improved motor indicated generally at 10 in Figs. 1 to 3 inclusive includes, longitudinally spaced and laterally extending mounting plates 11, 12, and 13 which may be spaced from each other as by means of pipes 14 registering with suitable apertures in the plates and through which threaded rods 15 extend; nuts 16 and washers 17 being provided as illustrated permitting removal of one plate from the assembly without disturbing the relation of the other plates.

An engine 18 is secured to the plate 11 preferably at the inside thereof, and a similar engine 18′ is secured to the plate 13 preferably at the inside thereof and coaxial with the engine 18.

As illustrated the engines 18 and 18′ are radial and of the so-called cam type, whereby the shaft speed is reduced. The engines however may be radial or other types including cranks formed by eccentrics.

The cam or crank housings 19 and 19′ of the engines are preferably separable, whereby each engine may be disassembled at will without disturbing the plates, the other engines, and cooperative mechanisms.

A removable cylindric cover 20 may be provided for extending between the plates 11 and 12, and 12 and 13, for protecting the engines and associated mechanisms.

The engine 18 when operating turns the drive sleeve 21, and a valve cam 22 is secured upon the drive sleeve 21 for operating a valve mechanism not shown of ordinary design.

A propeller shaft 23 extends through coaxial apertures in all the plates and is provided with a suitable bearing 24 in the plate 11, and with bearings 25 and 25′ at opposite sides of the plate 12.

A clutch 26, preferably actuated as by means of a lever 27 pivoted on a supporting bracket 28 secured to and extending from the plate 12, is arranged to make and break a driving connection between the sleeve 21 and the shaft 23.

The clutch 26 is preferably of the type illustrated in Fig. 5, and includes a collar 29 secured to the shaft 23 and having a single longitudinally opening notch 30 for receiving a single longitudinally extending tongue 31 secured on a disk 32 slidably connected with the sleeve 21, whereby the sleeve 21 is always connected with the shaft 23 in the same relative angular position, to preserve the timing of the engine 18.

A shaft tube 33 is mounted for rotation on the shaft 23 and extends at each side of the plate 13.

The motor 18' is provided with a drive sleeve 21' which is rotatable on the outer surface of the shaft tube 33.

The drive sleeve 21' is provided with a valve cam 22' for operating a usual valve actuating mechanism not shown.

A clutch 26' similar to the clutch 26, and preferably actuated as by means of a lever 27' pivoted on a supporting bracket 28' secured to and extending from the plate 12, is arranged to make and break a driving connection between the drive sleeve 21' and the shaft tube 33.

The shaft tube 33 is provided with a suitable bearing 34 mounted in the plate 13.

A counter-shaft 35 offset from the shaft 23 is journalled in suitable bearings 36 and 36' secured upon the plate 12, and the shaft 35 extends from each side of the plate 12.

At one end of the counter-shaft 35 a gear 37 is secured thereon which meshes with a gear 37' secured upon the shaft 23.

At the other end of the counter-shaft 35 a sprocket wheel 38, is secured and arranged to drive by means of a chain 39 a sprocket wheel 40 secured on the shaft tube 33.

Accordingly, if either engine 18 or 18' fails, the other engine will drive the shaft 23 and the shaft tube 33 in reverse directions through the above described gearing and chain connections.

When both engines are properly operating, and being arranged to run in opposite directions, the shaft 23 and the shaft tube 33 will be driven in reverse directions.

A principal use for the improved multiple motor thus constructed is for driving reversely rotating propellers for aircraft of the type set forth in my prior Patent No. 935,384, dated September 28, 1909.

Accordingly, a propeller 41 is secured upon the outer end of the shaft 23 and arranged to rotate counter-clockwise, and a propeller 42 is secured upon the shaft tube 33 and arranged to rotate clockwise.

The leading edges 43 and 43' of the propeller 41 are preferably swept back in a clockwise direction, and the leading edges 44 and 44' are swept back in a counter-clockwise direction, so that only a small portion of the two propeller blades will cover each other at any given moment, thereby reducing interference and greatly increasing the efficiency of the complete propeller arrangement.

The modified embodiment of the improved motor indicated generally at 10' in Fig. 4. includes all the parts of the embodiment 10, heretofore described, and in addition thereto a plate 11a spaced at the outside of the plate 11, and a plate 13a spaced at the outside of the plate 13.

An engine 18a is secured to the plate 11a preferably at the inside thereof, and a similar engine 18'a is secured to the plate 13a, preferably at the inside thereof and coaxial with the other engines.

As illustrated the engines 18a and 18'a are radial and of the so-called cam type, and the cam or crank housings 19a and 19'a of the engines are preferably separable, whereby each engine may be disassembled at will without disturbing the plates, the other engines, and the cooperative mechanisms.

Removable cylinder covers 20 are provided for extending between the plates 11 and 11a, and 13 and 13a.

The engine 18a when operating turns a drive sleeve 21a, and a valve cam 22a is secured upon the drive sleeve 21a for operating a valve mechanism not shown, in a usual manner.

The propeller shaft 23 extends through coaxial apertures in all the plates and is provided with a bearing 24a in the plate 11a.

A clutch 26a, preferably actuated as by means of a lever 27a is pivoted on a supporting bracket 28a secured to and extending from the plate 11, and is arranged to make and break a driving connection between the sleeve 21a and the shaft 23.

The clutch 26a is preferably of the type illustrated in Fig. 5.

The motor 18'a is provided with a drive sleeve 21'a which is rotatable on the outer surface of the shaft tube 33.

The drive sleeve 21'a is provided with a valve cam 22a for operating a usual valve actuating mechanism not shown.

A clutch 26'a, similar to the other clutches, and preferably actuated as by means of a lever 27'a pivoted on a supporting bracket 28'a secured to and extending from the plate 13a, is arranged to make and break a driving connection between the sleeve 21'a and the shaft tube 33.

The shaft tube 33 is provided with a suitable bearing 34a mounted in the plate 13a.

As aforesaid all the remaining parts of the motor 10' may be identical with those illustrated and described for the motor 10.

In any of the motors embodying the present improvements, a separate electric starting motor for each internal combustion engine may be provided if desired, for facilitating connecting and disconnecting the motors from the shafts and shaft tubes.

I claim:

1. Power transmission apparatus including a pair of coaxial shafts each adapted for rotation in a direction reverse to the direction of rotation of the other, a plurality of motors coaxial with the shafts each in driving connection with one shaft, and means operatively connecting the shafts with each other, whereby each of the shafts may be driven in its proper direction by any of the motors.

2. Power transmission apparatus including a plurality of longitudinally spaced frame members, two coaxial shafts, means mounted on one of the frame members and operatively connecting the shafts with each other, whereby each of the shafts is driven in its proper direction by rotation of the other, a motor mounted on a frame member at one side of the frame member mounting the shaft connecting means, and another motor mounted on a frame member at the other side of the frame member mounting the shaft connecting means, and means connecting each motor with one of the shafts.

3. Power transmission apparatus including a plurality of longitudinally spaced frame members, two coaxial shafts, means mounted on one of the frame members and operatively connecting the shafts with each other, whereby each of the shafts is driven in its proper direction by rotation of the other, a motor mounted on a frame member at one side of the frame member mounting the shaft connecting means, and another motor mounted on a frame member at the other side of the frame member mounting the shaft connecting means, and means selectively connecting each motor with one of the shafts.

4. Power transmission apparatus including a pair of coaxial shafts each adapted for rotation in a direction reverse to the direction of rotation of the other, a motor coaxial with and in driving connection with each shaft, and means operatively connecting the shafts with each other, whereby each of the shafts may be driven in its proper direction by either of the motors.

5. Power transmission apparatus including a pair of coaxial shafts each adapted for rotation in a direction reverse to the direction of rotation of the other, a motor coaxial with each shaft, means for selectively connecting each motor with its shaft, and means operatively connecting the shafts with each other, whereby each of the shafts may be driven in its proper direction by either of the motors.

6. Power transmission apparatus including a pair of coaxial shafts each adapted for rotation in a direction reverse to the direction of rotation of the other, a plurality of motors coaxial with each shaft, means for selectively connecting each motor with its shaft, and means operatively connecting the shafts with each other, whereby each of the shafts may be driven in its proper direction by any of the motors.

In testimony that I claim the above, I have hereunto subscribed my name.

WILLIAM H. MARTIN.